(12) United States Patent
Dulzo et al.

(10) Patent No.: US 8,428,789 B2
(45) Date of Patent: Apr. 23, 2013

(54) ENHANCED REFLASH USING MODULAR DISCRIMINATION

(75) Inventors: Jeffrey J. Dulzo, Novi, MI (US); Karin L. Turski, Rochester Hills, MI (US)

(73) Assignee: GM Global Technology Operations, LLC., Detroit, MI (US)

( * ) Notice: Subject to any disclaimer, the term of this patent is extended or adjusted under 35 U.S.C. 154(b) by 702 days.

(21) Appl. No.: 12/629,655

(22) Filed: Dec. 2, 2009

(65) Prior Publication Data

US 2011/0130892 A1 Jun. 2, 2011

(51) Int. Cl.
*G01R 31/01* (2006.01)

(52) U.S. Cl.
USPC .......................................... 701/2; 180/65.275

(58) Field of Classification Search ............. 701/2, 31.4; 455/418–421; 719/328–329; 180/65.265, 180/65.275
See application file for complete search history.

(56) References Cited

U.S. PATENT DOCUMENTS

| | | | | |
|---|---|---|---|---|
| 6,968,260 B2* | 11/2005 | Okada et al. | ................. | 701/33.4 |
| 7,369,926 B2* | 5/2008 | Hashimoto et al. | ............. | 701/36 |
| 2010/0026306 A1* | 2/2010 | Zhang et al. | ................. | 324/426 |

\* cited by examiner

*Primary Examiner* — Dalena Tran

(57) ABSTRACT

An improved system, method, and mechanism for executing and reconfiguring a reflash procedure maintains a vehicle state of charge while avoiding defective reflash operations. In an aspect of the invention, the technique includes receiving a reflash request, i.e., at a controller associated with the vehicle, the reflash request identifying one or more target modules and specifying replacement information. A reflash procedure in accordance with the received request is then begun. However, when and if the charge state of the vehicle drops below a predetermined threshold, the controller modifies the reflash procedure by first categorizing individual ongoing reflash operations and stopping any reflash operations belonging to the second class, while continuing any reflash operations belonging to the first class.

15 Claims, 5 Drawing Sheets

ENHANCED REFLASH USING MODULAR DISCRIMINATION

BACKGROUND OF THE INVENTION

The automobile, which burst onto the world stage at the dawn of the last century, has since undergone a constant cycle of refinement and improvement. Such improvements have affected every aspect of the vehicle including customer comfort, vehicle performance, fuel consumption, noise level, emissions level, and so on. Traditionally, each improvement cycle required a new car model, requiring new purchases and forcing obsolescence of outdated models.

Gradually, motivated and mechanically-skilled individuals began to improve existing cars instead of simply replacing them, and this model soon caught on with the vehicle manufacturers themselves. Essentially, upgrading a vehicle instead of replacing it served to improve the consumer value by lengthening the product lifetime and thus decreasing the cost per mile driven. Thus, existing car models began to see in-service upgrades, often by way of recall or special offer to vehicle owners.

This trend accelerated with the computerization of vehicles. In particular, as more and more vehicle functions were executed in module form, the upgrading of such functions increasingly required only the replacement of one or more modules, rather than changing the mechanical components of the vehicle. For example, if ignition timing or valve timing needs to be changed—something that previously would have required replacing mechanical timing components or grinding the valve lifter cams—this can now be accomplished by simply changing a parameter in an electronic module.

Initially, such electronic modules were read-only, i.e., they could not be reprogrammed, only replaced. Examples of such devices include hard-wired circuits and PROMs. However, as electronics manufacturing technology improved, many vehicle functional modules began to employ reprogrammable memories such as EPROMS and EEPROMS. Today, flash memories are the predominant memory medium for vehicle modules.

Thus, when an electronically controlled sequence or an electronically stored parameter value needs to be changed in a modern car, the appropriate electronic module can be "reflashed," i.e., programmed with the new code or data. However, reflashing is an energy-intensive process. And while reflashing generally produces a robust system, the system is very vulnerable to loss of power during the reflashing process itself. In particular, if power is lost while a reflashing procedure is only partially completed, the affected module or modules will at the very least need to be reprogrammed, and in some cases may be damaged to the point of requiring replacement.

Thus, while reflashing provides many benefits, it also presents certain challenges that the prior art has not been able to overcome.

BRIEF SUMMARY OF THE INVENTION

The invention provides an improved system, method, and mechanism for executing and reconfiguring a reflash procedure via modular discrimination to maintain a vehicle state of charge while avoiding defective reflash operations. In an aspect of the invention, the technique includes receiving a reflash request, i.e., at a controller associated with the vehicle, the reflash request identifying one or more target modules and specifying replacement information. A reflash procedure in accordance with the received request is then begun.

While performing the reflash procedure, the controller evaluates the charge state of the vehicle to determine whether it has dropped below a predetermined threshold. If the charge state has dropped to that level, the controller modifies the reflash procedure by first categorizing individual ongoing reflash operations within the reflash procedure into at least a first class and a second class. The controller then stops any reflash operations pertaining to individual ongoing reflash operations categorized as belonging to the second class, while continuing any reflash operations pertaining to individual ongoing reflash operations categorized as belonging to the first class.

Other objects and advantages of the invention will become apparent upon reading the following detailed description and upon reference to the drawings.

DETAILED DESCRIPTION OF THE INVENTION

Before explaining the details of the invention and the environment wherein the invention may be used, a brief overview is given to guide the reader. In overview, not intended to limit the claims, the invention provides a system and method for executing and reconfiguring a reflash procedure that maintains a vehicle state of charge while avoiding defective reflash operations. In an aspect of the invention, the technique includes receiving a reflash request, i.e., at a controller associated with the vehicle, the reflash request identifying one or more target modules and specifying replacement information. A reflash procedure in accordance with the received request is then begun. However, when and if the charge state of the vehicle drops below a predetermined threshold, the controller modifies the reflash procedure by first categorizing individual ongoing reflash operations and stopping any reflash operations belonging to the second class, while continuing any reflash operations belonging to the first class.

Figure 1:
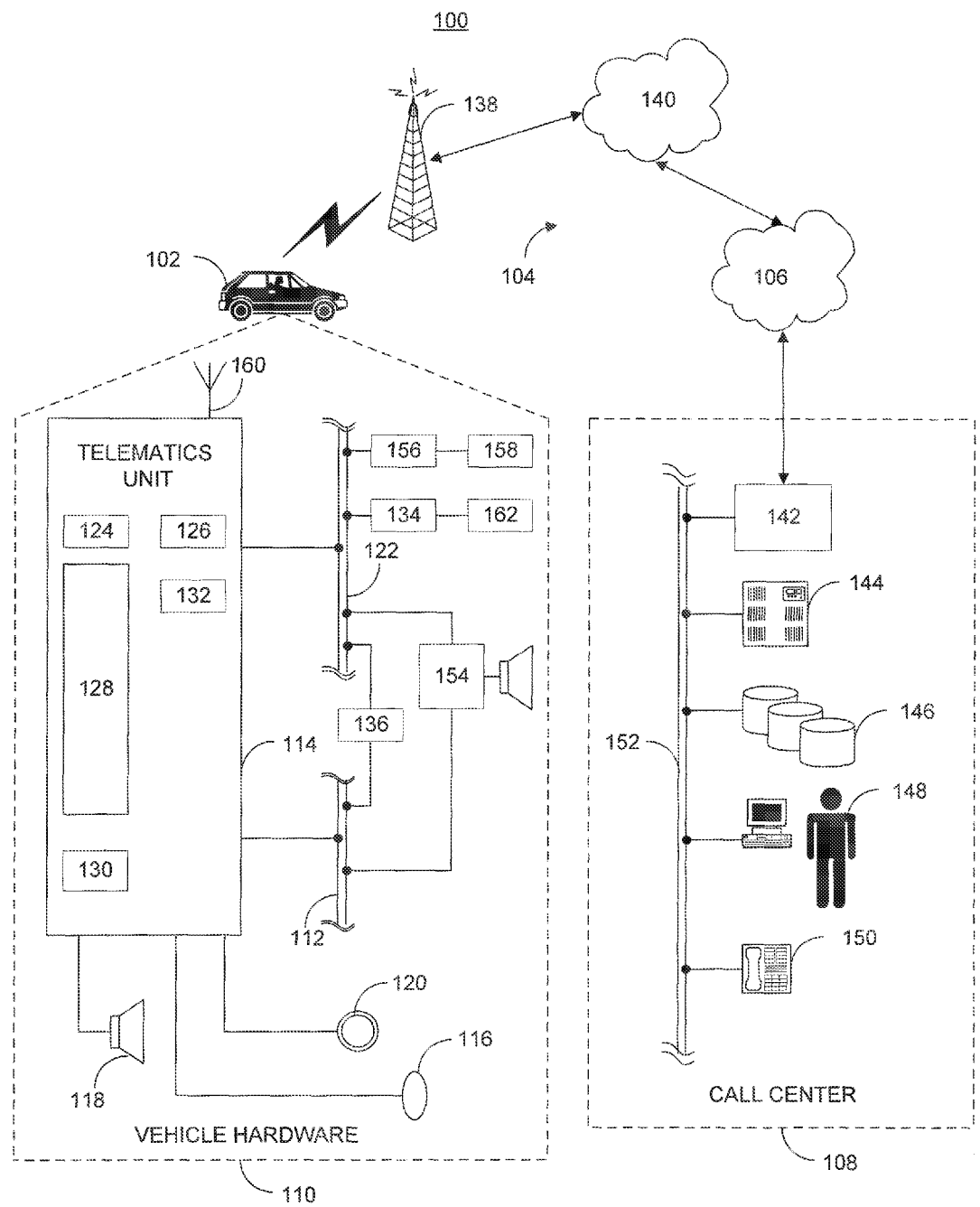
FIG. 1 is a schematic diagram of an operating environment for a mobile vehicle communication system.

An exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted above, many functions in a modern automobile are executed by electronic modules in communication with some or all of the elements described with respect to FIG. 1. Such modules may include a power train control module (PCM) ABS/traction-stability control module, climate control module, air bag module, keyless entry module and so on. These various modules control many aspects of a vehicle's performance and operation including onboard diagnostic monitoring, execution of self-checks, as well as control of idle speed, fuel mixture, emission functions, cold start idle quality, idle smoothness and so on.

Due the nature of the memory components in the various modules, it is important to maintain a constant, steady voltage supply to the during a reflash operation. For example, if the system voltage drops due to activation of a cooling fan, this could interfere with the flash operation. Thus, certain preventive are sometimes taken, i.e., disabling intermittent components (e.g., by switching off the vehicle ignition). However, this does not prevent the steady state system voltage from nonetheless dropping below an acceptable level. For example, a poorly charged car that initiates a reflash of its PCM may experience insufficient system voltage part way through the operation, resulting in a failed operation at best, and a damaged PCM at worst.

Although it is generally recommended to fully charge the vehicle battery and leave the charger attached during a reflash operation, this is not always practiced, and indeed, is not always practicable. For example, an automatic remote reflash operation may take place when the user is not even in proximity to the vehicle. Thus, current preventative measures are not universally adequate to avoid a failed reflash. Moreover, even if the reflash succeeds, there is a danger that the vehicle state of charge may have been depleted to the point that the vehicle will not start without external power assistance.

In order to remedy these shortcomings, various implementations of the invention allow selectively reconfiguring the reflash operation, while continuing any critical aspects of the operation, to avoid a failed reflash and/or a no-start condition. In overview, the system creates a stratified hierarchy of module designations, with certain modules being critical and other modules being less critical, while yet other modules may be non-critical. The categorization may be fixed or may be active, i.e., changing in response to industry updates or in response to the present state of the reflash operation.

A controller monitors system battery voltage prior to and during the reflash operation, and enacts a reflash reconfiguration event if the system battery voltage is determined to be at less than a threshold level. In one implementation, a plurality of thresholds are provided, with the higher threshold being used to exclude reflashing, or to exclude finishing the reflashing of, non-critical modules. The lower threshold level, representative of a danger of a non-start condition, may be used to exclude all but critical modules from the continued reflash operation.

Figure 2:
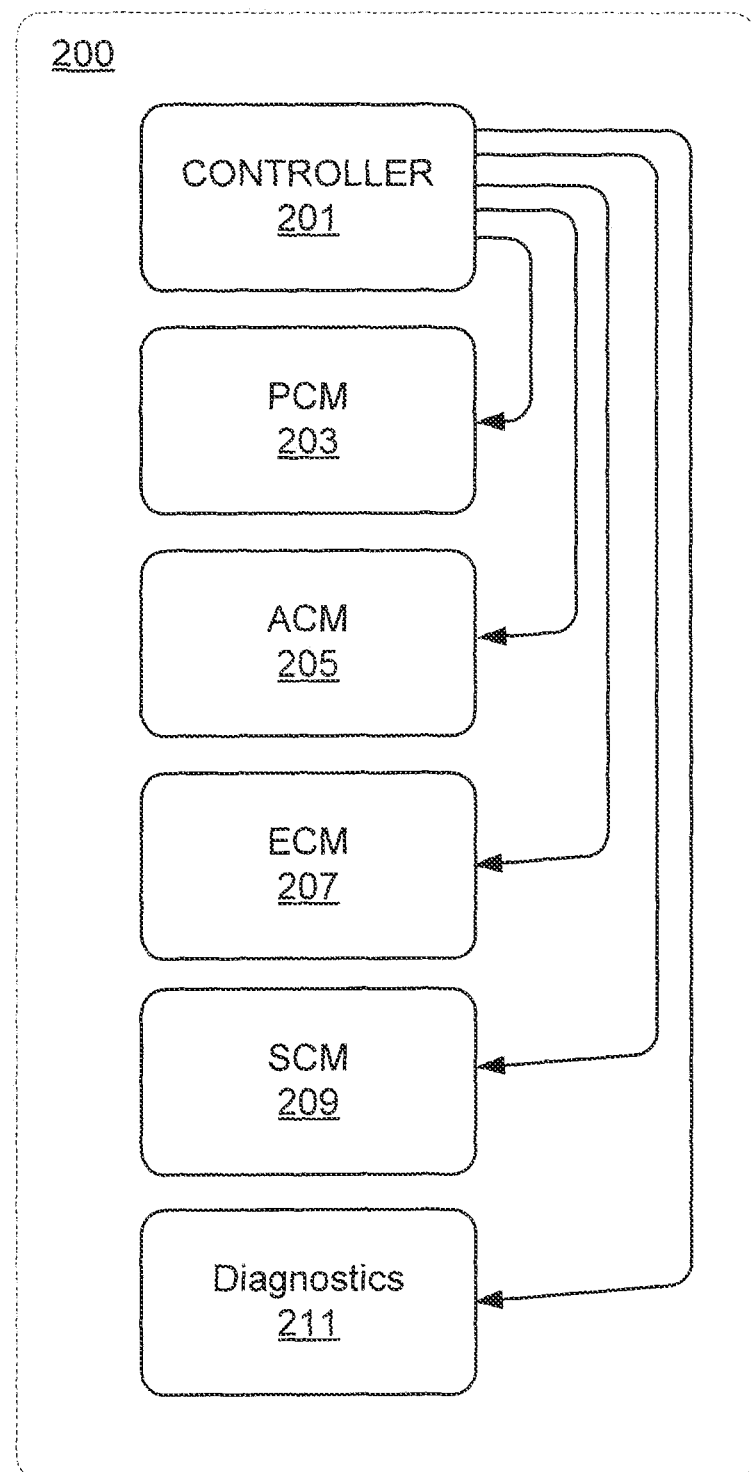
FIG. 2 is a schematic illustration of various exemplary modules within a vehicle, under the control of a controller for purposes of showing an environment within which the invention may be implemented.

FIG. 2 is a schematic illustration of various exemplary modules within a vehicle 200, under the control of controller 201 for purposes of reflashing. The illustrated module include the PCM 203, airbag control module (ACM) 205, emissions control module (ECM) 207, stability control module (SCM) 209, and diagnostics module 211. In this implementation, each module is communicably linked to the controller 201 for at least purposes of reflashing, but may also be linked to the controller 201 for other purposes.

The controller 201 is linked, in one implementation, to a remote center, i.e., call center 108, via one or more of wireless carrier system 104, a land network 106 (not shown in FIG. 2). In this manner, the controller 201 may receive update notifications and data without requiring that the targeted vehicle be physically brought to a dealer or mechanic for analysis and updating.

Figure 3:
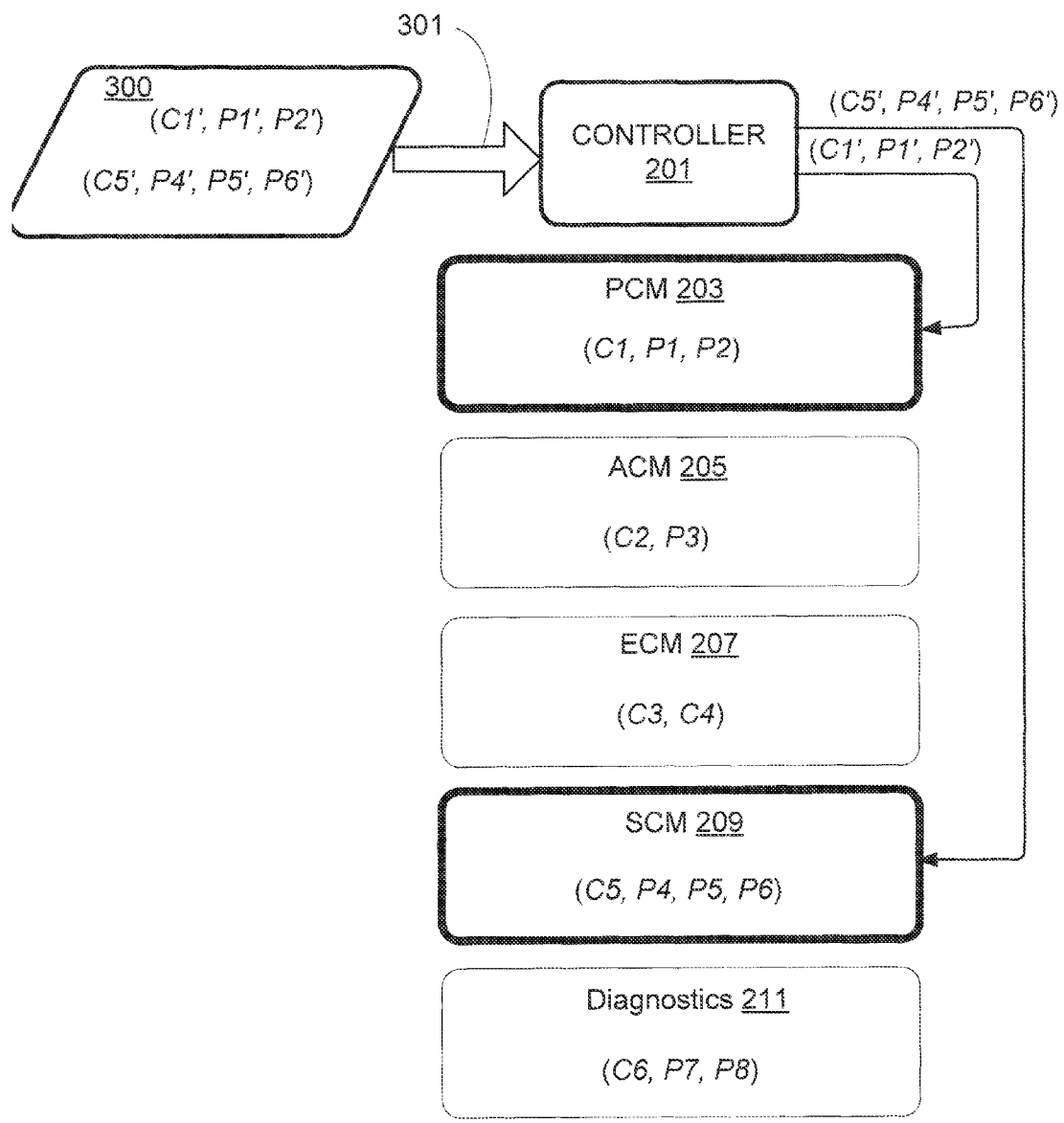
FIG. 3 is a data flow diagram showing existing data and replacement data to be reflashed into modules such as those shown in FIG. 2.

Referring now to FIG. 3, a data flow is shown corresponding to existing data and replacement data to be reflashed into modules such as those shown in FIG. 2. The illustrated data flow is illustrated in greatly simplified form for ease of understanding. In the illustration, the PCM 203 contains code C1 and parameters P1 and P2. Similarly, the ACM 205 contains code C2 and parameter P3, the ECM 207 contains code C3 and C4, the SCM 209 contains code C5 and parameters P4, P5, and P6, and the Diagnostics module 211 contains code C6 and parameters P7 and P8.

A flash update 300 is received containing updated code and parameters for the PCM 203 and SCM 209. In particular, the update 300 contains replacement code C1' and replacement parameters P1' and P2' for the PCM 203, as well as replacement code C5' and replacement parameters P4', P5', and P6' for the SCM 209. After the replacement parameters are received, the process of reflashing the PCM 203 and SCM 209 takes a relatively short but finite amount of time, and during this time, the supply voltage in the system must remain above a certain level and must not fluctuate substantially from constant voltage. Temporary voltage fluctuations may scramble or introduce errors, and a sustained drop of the voltage below the required level may disrupt the reflash process entirely and leave certain modules only partially updated.

Although steps may be taken, as noted above, to ensure a constant supply voltage at the appropriate level, it is generally not practical to take such measures prior to an automatic remote reflash. However, in an aspect of the invention, the controller 201 is configured (e.g., programmed) to monitor the vehicle supply voltage and to reconfigure an ongoing reflash operation in response to the detection of an imminent problem condition in a manner that maximizes the likelihood of the vehicle being operational after the operation.

Figure 4:
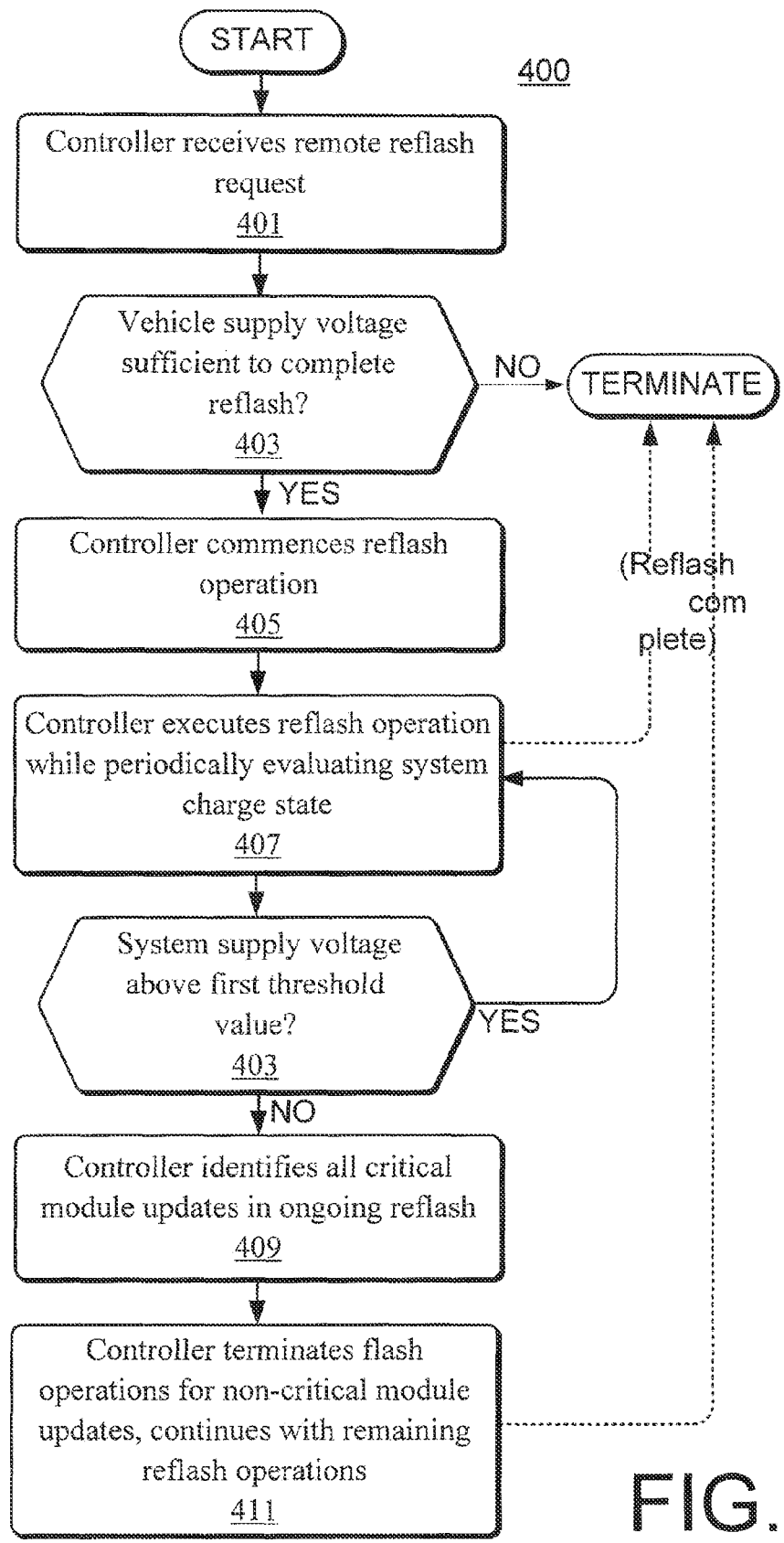
FIG. 4 is a flow chart showing an exemplary process in keeping with the described principles.

A flow chart showing an exemplary process 400 in keeping with the described principles is shown in FIG. 4. In particular, at stage 401 of the process 400, the controller 201 receives a reflash request, i.e., by remote request. The reflash request will typically contain specific update code and/or parameters for an identified module or modules. Before executing the request, the controller 201 checks at stage 403 whether the vehicle supply voltage indicates a state of charge calculated as sufficient to complete the update procedure. If the state of charge is not sufficient, then the process 400 terminates. However, if the state of charge is sufficient, then the process 400 flows to stage 405, wherein the reflash operation is commenced.

As the reflash continues at stage 407, the controller 201 periodically reevaluates the system supply voltage against a first threshold value. If the system supply voltage remains above the first threshold value, then the reflash operation continues. If, however, the system supply voltage drops below the first threshold value, then the process flows to stage 409 while continuing the update, and identifies all critical module updates involved in the ongoing reflash. As used herein, a module update is critical if the update must be completed, i.e., not terminated when partially completed, in order for the vehicle to operate and do so in a safe manner. For example, if the PCM 203 has been partially updated and it is known that the vehicle will not start if the update to that module is interrupted, then this is a critical update that must be completed.

At stage 411, the controller 201 terminates all flash operations relative to non-critical module updates and continues with the remaining reflash operations. After the identified critical module updates are completed, the process terminates. It will be appreciated that the controller 201 may also set a flag or other signifier when the reflash operation is complete, and the controller or other system may cause a notification to be presented to the user the next time that the vehicle is started, signifying to the user that a reflash has occurred.

Figure 5:
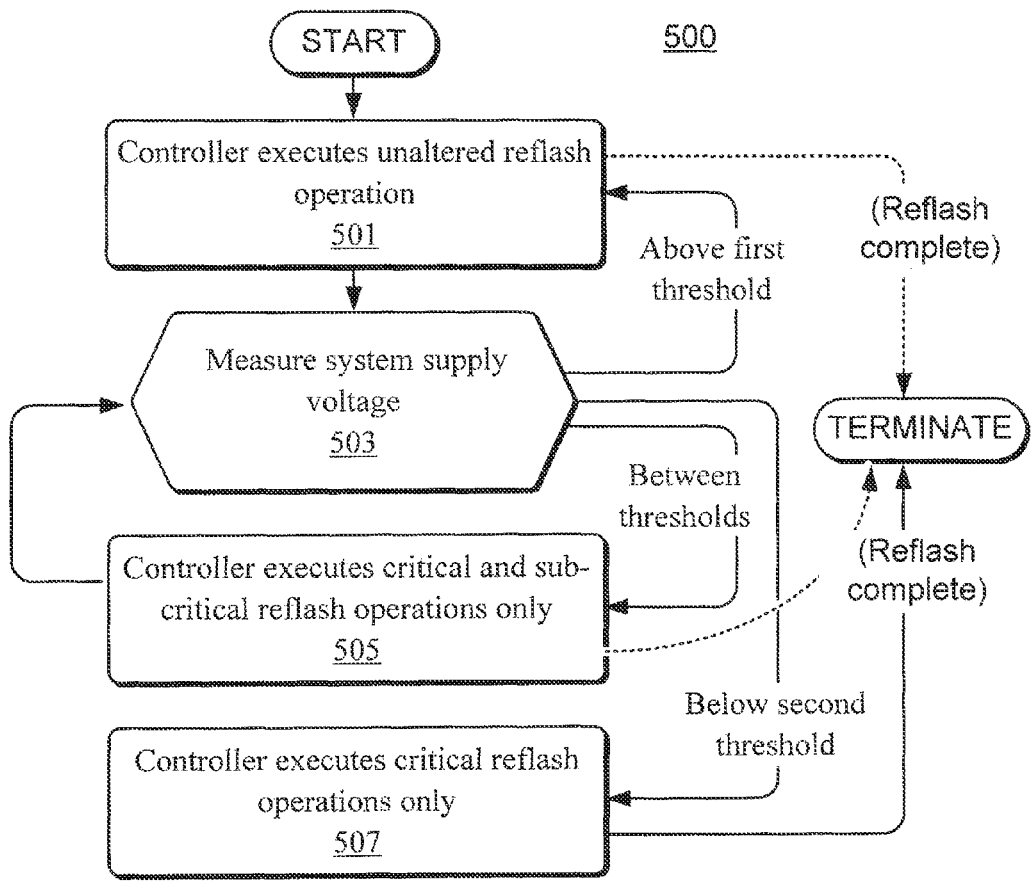
FIG. 5 is a flowchart showing an alternative sub-process according to an aspect of the described principles.

In an alternative implementation, the module reflash classification is stratified into three or more levels to provide additional granularity to the reflash reduction process. A flow chart showing a process 500 according to this alternative implementation is shown in FIG. 5. The illustrated example assumes a stratification of the reflash module operations into critical, sub-critical, and non-critical operations.

The process 500 begins in the same manner as the process 400, and thus, for the sake of simplicity, the flow chart of FIG. 5 focuses on the portion of the process beginning after the commencement of the reflash pursuant to a received reflash order or request. As the reflash operation proceeds at stage 501, the controller 201 periodically evaluates the vehicle state of charge at stage 503.

In particular, the controller 201 evaluates the state of charge against two thresholds, i.e., a first threshold and second lower threshold. If the state of charge remains above the upper threshold, the reflash operation continues unaltered until it completes and the process 500 terminates. If however, the state of charge drops below the first threshold but remains above the second threshold, the process 500 flows to stage 505, wherein the controller 201 reduces the scope of the reflash operation to exclude non-critical operations. The process 500 then continues in stage 505, while periodically reevaluating the system charge state. If the system stage of charge remains between the first and second thresholds, then the modified reflash operation continues until termination.

If however, the controller 201 finds at stage 503 (from stage 505) that the system charge state has fallen below the second threshold as well, then the process 500 moves to stage 507, wherein the controller 201 reduces the scope of the reflash operation to include only critical operations. The process 500 then continues in stage 507 until termination.

It will be appreciated that the foregoing methods and implementations for enhanced reflash security through dynamic module reflash operation classification are merely examples of the inventive principles, and that these illustrate only preferred techniques. It is contemplated that other implementations of the invention may differ in detail from foregoing examples. All references to the invention are intended to reference the particular example of the invention being discussed at that point and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of enhancing a reflash procedure via modular discrimination to maintain a vehicle state of charge while avoiding defective reflash operations comprising:
   receiving a reflash request, by a controller associated with the vehicle, the reflash request identifying one or more target modules and specifying replacement information;
   commencing, by the controller, a reflash procedure in accordance with the received request, wherein the reflash procedure entails execution of a plurality of individual reflash operations;
   while performing the reflash procedure, evaluating, by the controller, a charge state of the vehicle to determine whether the charge state of the vehicle has dropped below a predetermined threshold; and in response to detecting that the charge state of the vehicle has dropped below the predetermined threshold:
- identifying, by the controller, a category for each ongoing individual reflash operation from a set of categories, wherein the set of categories includes a first class and a second class;
- modifying, by the controller, the reflash procedure by: ceasing any reflash operations pertaining to individual ongoing reflash operations identified as belonging to the second class; and completing any reflash operations pertaining to individual ongoing reflash identified as belonging to the first class.

2. The method according to claim 1, wherein the reflash request is received by the controller via a wireless network.

3. The method according to claim 1, wherein the predetermined threshold is based on a determination of a charge state below which at least one reflash operation specified in the reflash request would be defective.

4. The method according to claim 1, wherein the predetermined threshold is based on a determination of a charge state below which the vehicle will not have sufficient power left to start the vehicle if all reflash operations specified in the reflash request are executed.

5. The method according to claim 1, wherein the plurality of individual reflash operations pertain to at least two separate electronic modules.

6. The method according to claim 1, wherein individual ongoing reflash operations identified as belonging to the first class are critical reflash operations and individual reflash operations identified as belonging to the second class are non-critical reflash operations.

7. A non-transitory computer-readable medium, at a controller associated with a vehicle, having thereon computer-executable instructions for enhancing a reflash procedure via modular discrimination to maintain a vehicle state of charge while avoiding defective reflash operations, the instructions comprising instructions for:
- receiving a reflash request, the reflash request identifying one or more target modules and specifying replacement information;
- commencing a reflash procedure in accordance with the received request, wherein the reflash procedure entails execution of a plurality of individual reflash operations, wherein the plurality of individual reflash operations are classified into categories, the categories including a first class and a second class;
- evaluating a charge state of the vehicle to determine whether the charge state of the vehicle has dropped below a predetermined threshold while performing the reflash procedure; and
- in response to detecting that the charge state of the vehicle has dropped below the predetermined threshold:
  - identifying a category for each ongoing individual reflash operation from a set of categories, wherein the set of categories includes a first class and a second class;
  - modifying the reflash procedure by: ceasing any reflash operations pertaining to individual ongoing reflash operations identified as belonging to the second class; and completing any reflash operations pertaining to individual ongoing reflash identified as belonging to the first class.

8. The medium according to claim 7, wherein the predetermined threshold is based on a determination of a charge state below which at least one reflash operation specified in the reflash request would be defective.

9. The medium according to claim 7, wherein the predetermined threshold is based on determination of a charge state below which the vehicle will not have sufficient power left to start the vehicle if all reflash operations specified in the reflash request are executed.

10. The medium according to claim 7, wherein the plurality of individual reflash operations pertain to at least two separate electronic modules.

11. The medium according to claim 7, wherein individual reflash operations identified as belonging to the first class are critical reflash operations and individual reflash operations identified as belonging to the second class are non-critical reflash operations.

12. A method of updating an electronic module in a vehicle by performing one or more reflash operations, the method comprising:
- receiving a reflash request, by a controller at the vehicle, the reflash request specifying a plurality of reflash operations to be executed relative to the electronic module;
- determining, by the controller, that execution of all reflash operations specified in the reflash request would result in a state of charge for the vehicle that is lower than a predetermined threshold;
- reducing, by the controller, the set of reflash operations to be executed; and
- executing the reduced set of reflash operations.

13. The method according to claim 12, wherein the reflash request is received at the controller via a wireless network.

14. The method according to claim 12, wherein the predetermined threshold is based on a determination of a charge state below which at least one reflash operation specified in the reflash request would be defective.

15. The method according to claim 12, wherein the predetermined threshold is based on a determination of a charge state below which the vehicle will not have sufficient power left to start the vehicle if all reflash operations specified in the reflash request are executed.

* * * * *